United States Patent Office 3,291,928
Patented Dec. 13, 1966

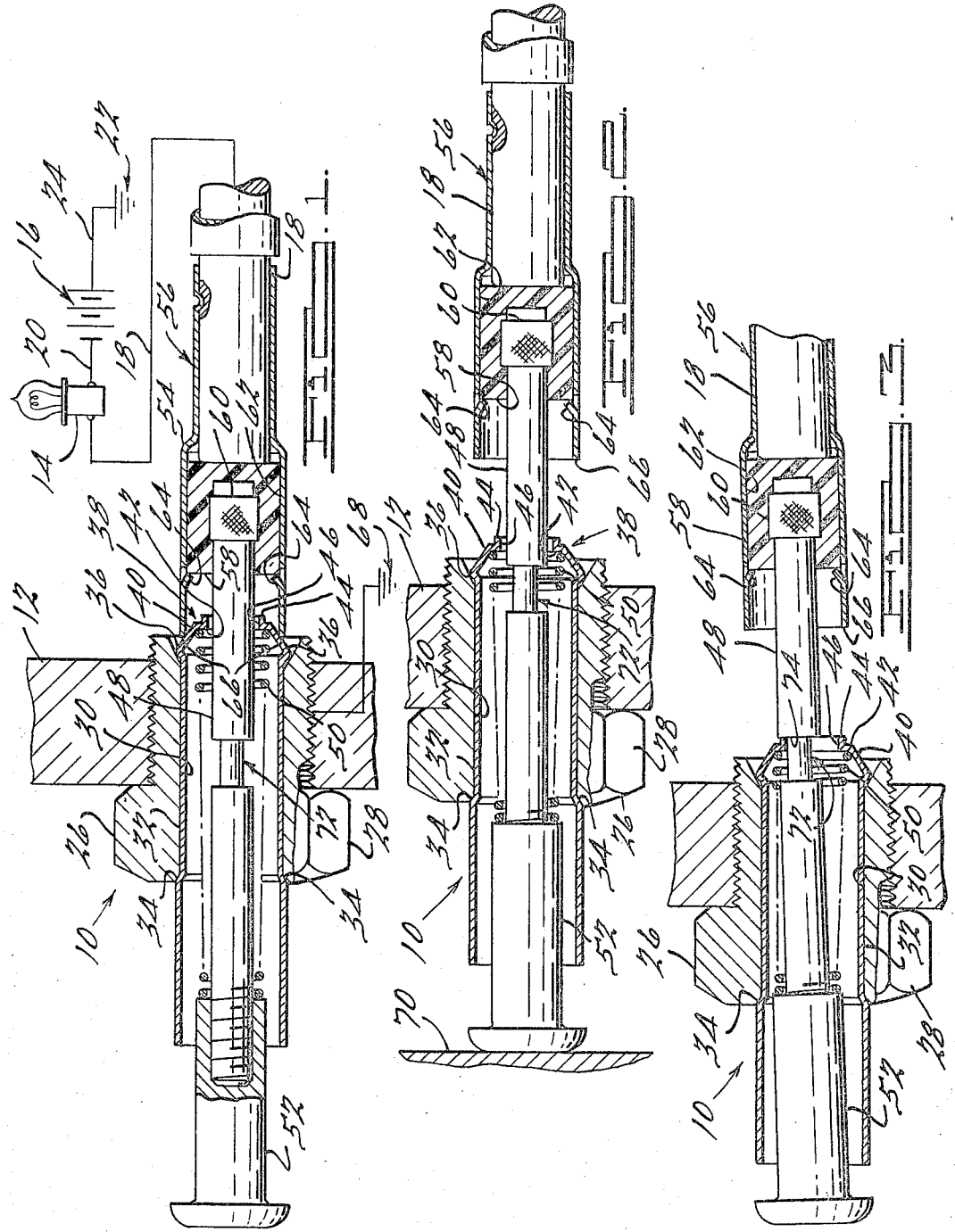

3,291,928
CLOSURE ACTUATED ELECTRIC SWITCH WITH MANUALLY OPERATED HOLDING MEANS
Evan L. Jones, Detroit, Mich., assignor to Chrysler Corporation, Highland Park, Mich., a corporation of Delaware
Filed Aug. 27, 1965, Ser. No. 483,101
1 Claim. (Cl. 200—61.79)

This invention relates generally to an electric switch and more particularly to an electric switch automatically actuated to a closed position in response to, for example, the movement of a cooperating member such as the opening of an associated door.

In the past, automotive vehicles have undergone substantial changes in both interior lighting and the means for controlling such lighting. The demand for increased interior lighting has resulted in the use of both a greater number of light bulbs and also light bulbs which consume greater quantities of electrical energy.

In the past, only manually actuated electric switches were provided within the interior of the vehicle for closing the circuits energizing the interior lights (often referred to as courtesy lights). This general arrangement had been improved by providing spring actuated electric switches, usually located in the portion defining a vehicle door opening, which would be automatically actuated to a closed position whenever the associated door was moved toward open position. The provision of such automatically actuated light switches proved to be a material benefit because proper lighting was always provided for a passenger whether entering or leaving the vehicle. However, even though such automatic switches were an improvement, the use thereof has also caused attendant difficulties.

For example, automobiles often have their doors open for extended periods of time in order to have certain repair or maintenance operations performed. Consequently, the automatic door actuated light switches are closed causing the interior lights to be energized during such extended periods of time. Further, because of the increased interior lighting presently provided in automobiles, prolonged continuous energization of the interior lights places a relatively heavy demand on the associated storage battery. In instances where the storage battery is not near a fully charged condition, such demands caused by the prolonged actuation of the interior lights can reduce the charge level of the battery to a value insufficient to provide engine cranking and ignition firing energy.

Accordingly, an object of this invention is to provide an improved automatically actuated light switch which has means provided for temporarily rendering said light switch incapable of closing the circuit controlling energization of the vehicular interior lights.

Another more specific object of this invention is to provide an improved automatically actuated light switch, adapted to be mounted in an automotive vehicle so as to be automatically closed and opened in accordance with opening and closing movements of an associated door, having means formed thereon for manual actuation to and retention in a position rendering said switch incapable of closing an electric circuit associated therewith.

Other more specific objects and advantages of this invention will become apparent when reference is made to the following description and accompanying drawings wherein:

FIGURE 1 is a longitudinal cross-sectional view of an electric switch, constructed in accordance with this invention, and shown mounted in a fragmentary portion of a vehicular door frame;

FIGURE 2 is a view, in cross-section, illustrating the switch of FIGURE 1 in a position other than that shown in FIGURE 1; and FIGURE 3 is a view, also in cross-section, illustrating the switch in a position other than those shown by FIGURES 1 and 2 and made possible by this invention.

Referring now in greater detail to the drawings, FIGURE 1 illustrates the electric switch 10, of the invention, as being suitably secured to a vehicular door frame portion 12 and electrically connected serially with a suitable lighting system, represented by a bulb 14, and battery 16 by means of electrical conductors 18 and 20. Battery 16 is also suitably grounded as at 22 by means of an electrical conductor 24.

The switch assembly 10 is comprised of an externally threaded nut member 26, provided with a tool engaging portion 28, having an axially directed opening 30 formed therethrough for the reception of a generally tubular body 32. The tubular body 32 may be retained within nut 26 by any suitable means such as, for example, generally outwardly flared portions 34 and 36 which cooperate with enlarged opposite ends of the opening 30.

End 38 of body 32 is also preferably formed to provide a generally radially inwardly directed tapered or conical surface 40 which terminates in a radially directed annular flange portion 42. The annular flange portion 42 is also provided with an axially directed tubular or lip portion 44 forming an opening 46 for the reception therethrough of an actuating rod 48.

A coiled compression spring 50 is received within tubular body 32 generally about rod 48 so as to have one end abutting against the flange portion 42 (serving as a spring retainer) and the opposite end abutting against a head or striker portion 52 secured to and carried by one end of rod 48.

The actuating rod 48, which is axially movable relative to tubular body 32, carries at its end opposite to the head 52 a tubular contact member 54 which is illustrated as having a portion 56 of reduced cross-section for securing thereto an end of conductor 18. Nut 26, tubular body 34 and tubular contact 54 are metallic; further, because of structural requirements the rod 48 as well as the head 52 are also metallic. Therefore, an intermediate connecting member 58 of electrically non-conductive material is secured about the preferably knurled end 60 of rod 48 and situated within the enlarged opening 62 of contact member 54. Tabs 64 may be struck out of contact 54 and bent generally inwardly thereof in order to provide for retention of insulator 58 within opening 62 and thereby assure an operative mechanical connection between rod 48 and contact 54.

As should be evident from FIGURE 1, the open end 66 of contact 56 provides a ring-like contacting surface for engagement with the conical contacting surface 40 of body 32 in order to complete an electrical circuit therethrough. Of course, nut 26 is suitably grounded as schematically illustrated at 68 by means of, for example, a metallic structural portion of the vehicle as the door frame 12. When the respective elements are in the positions shown in FIGURE 1 the electrical circuit through bulb 14 is of course completed. This would normally be the situation whenever the associated vehicle door was opened.

FIGURE 2 illustrates the opening of the electrical circuit as caused by the associated door 70 abuttingly engaging the head 52 and axially displacing actuating rod 48 and the contact 56 carried thereby. As the end 66 of contact 56 moves away from conical surface 40, the circuit is opened de-energizing the bulb 14.

FIGURE 3 illustrates how the switch 10 can be manually positioned so as to maintain an open electrical circuit even though the associated door is kept in an open position for an extended period of time.

As illustrated in each of the views, the rod 48 is provided with a generally circumferential recess 72 formed in the peripheral surface intermediate the ends thereof. Accordingly, as best seen in FIGURE 3, with the vehicular door 70 opened it is possible to manually depress head 52 and rod 48, and if necessary in a somewhat skew relationship to body 32, to a degree permitting the lip 44 and flange portion 42 to be at least partially received within the recess 72. Releasing head 52 then enables spring 50 to urge rod 48 in the circuit closing direction (illustrated as being to the left) thereby causing lip or tubular portion 44 to abut against the generally radially directed surface or shoulder 74 which defines one axial wall of the recess 72.

This position of the rod 48 can be maintained for any extended period of time, without the aid of any extra devices, even though the associated door 70 is in an opened position. Accordingly even though the door 70 has to remain opened for vehicle servicing or repairs, the interior lighting, as represented by bulb 14, will not place excessive demands on the source of electrical potential 16.

Although only one preferred embodiment of the invention has been disclosed and described, it should be apparent that other embodiments and modifications of the invention are possible within the scope of the appended claim.

I claim:

An electric switch adapted to be opened and closed by a hinge member comprising a tubular body portion adapted for support in a relatively stationary support member, a relatively movable tubular contact member having one end for engagement with one end of said body portion and another end for engagement with a suitable conductor of an associated electrical circuit, said body portion one end having a radially inwardly directed flange portion formed thereon defining a centrally disposed aperture, an elongated actuating rod extending through said aperture and having one end thereof operatively connected to said tubular contact and another end projecting beyond an opposite end of said body portion, said actuating rod being of a cross-sectional area normally permitting of relatively slight transverse movement of said rod relative to said aperture but normally permitting of relatively large transverse movement of said rod relative to said opposite end of said body portion, a coiled compression spring situated about said rod and having one end abuttingly engaging said flange portion and another end abuttingly engaging said rod near said other end of said rod, said spring being effective to resiliently urge said rod in one direction in order to cause said contact member to engage said body portion and thereby complete said associated electrical circuit whenever said hinged member is moved away from said rod, said coiled spring also being effective to tend to maintain said rod in axial alignment with said body portion, said rod being effective whenever moved by said hinged member in a direction opposite to said one direction to move said contact out of engagement with said body portion thereby opening said circuit, and an annular recess formed in said rod intermediate the ends thereof adapted to engage said flange portion whenever said rod is moved a sufficient distance in excess of the distance normally moved by said hinged member in said opposite direction in order to prevent said spring from urging said contact member into engagement with said body portion, said annular recess permitting said rod to be moved through a relatively large transverse movement with respect to said aperture in order to place said rod in a generally skewed position with respect to the axis of said tubular body portion.

References Cited by the Examiner
UNITED STATES PATENTS

| 1,316,372 | 9/1919 | Liebreich | 200—159 X |
| 2,523,125 | 9/1950 | Ley | 200—61 |
| 2,881,278 | 4/1959 | Gores | 200—159 |

BERNARD A. GILHEANY, *Primary Examiner.*

J. J. BAKER, *Assistant Examiner.*